3,580,932
PHARMACOLOGICALLY ACTIVE DIETHYL-
(2-DIBENZOFURANYL)-MALONATE
Bruno Cavalleri, Milan, and Elvio Bellasio, Albate, Italy,
and Emilio Testa, Ticino, Switzerland, assignors to
Lepetit S.p.A.-Gruppo per la Ricerca Scientifica e la
Produzione Chimica Farmaceutica, Milan, Italy
No Drawing. Filed May 3, 1968, Ser. No. 726,556
Int. Cl. C07d 5/44
U.S. Cl. 260—346.2                            1 Claim

ABSTRACT OF THE DISCLOSURE

The invention is concerned with diethyl α-(2-dibenzofuranyl)-malonate, a substance with high antiinflammatory activity. A method for the preparation of the new compound is also described.

---

This invention is concerned with a new derivative of the malonic acid and with a method for preparing it. More particularly the compound of the invention is the diethyl α-(2-dibenzofuranyl)-malonate, of the following formula:

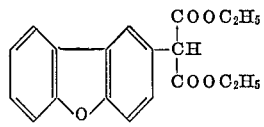

The process for preparing the compound consists in heating a mole of ethyl 2-dibenzofuranylacetate with 1–1.5 moles of sodium ethoxide dissolved in overequimolecular excess of diethyl carbonate.

The compound proved to be a very interesting antiinflammatory agent. The antiflogistic activity was evaluated through the well-known carrageenin induced edema test. For our experiments we used Wistar strain female rats, weighing between 120 and 150 g. and the compound was administered by oral route, suspended in a 10% acacia gum solution, at different doses.

The antiinflammatory activity was later confirmed by means of the granuloma pellet test. We used Wistar rats, in which two cotton pellets were implanted under the skin; the experience was carried out on groups of seven animals for each dose. The compound was administered orally, suspended in a 0.5% aqueous solution of methocel, and the treatment was protracted for 6 days.

The results obtained are reported in the following together with the $LD_{50}$ in mice, and are to be considered particularly favourable, if one bears in mind the low toxicity fo the drug.

| $LD_{50}$, mice os, mg./kg. | Dose, rats os, mg./kg. | Carrageenin edema. Decrease of edema, percent | Cotton pellets. Decrease in weight of granuloma, percent |
|---|---|---|---|
| 1,000 | 50 | 16.7 | |
| | 100 | 27.8 | |
| | 200 | 48.6 | 38.6 |

Excellent results were obtained in the treatment of some skin diseases, such as eczema and allergic dermatitis, using ointments containing from 0.1 to 1 g. of the active drug mixed with usual pharmaceutical carriers. The following composition can be used:

|  | G. |
|---|---|
| Diethyl α-(2-dibenzofuranyl)-malonate | 1 |
| Liquid petrolatum | 15 |
| Lanolin | 5 |
| Petrolatum q.s. to 100 g. | |

The compound of the invention was found to be very effective in healing deseases such as rheumatic fever, chronic rheumatic arthritis, rheumatoid arthritis, and gout arthritis and any of the usual forms of administration, i.e. oral, intramuscular, and rectal gave satisfactory results. We give in the following some examples of therapeutic compositions we have used. The daily dose ranges from about 0.1 to 0.9 g.

Tablets

|  | Mg. |
|---|---|
| Diethyl α-(2-dibenzofuranyl)-malonate | 150 |
| Lactose | 150 |
| Starch | 50 |
| Mg. stearate | 2 |
| Diethyl α-(2-dibenzofuranyl)-malonate | 150 |
| Avicel | 70 |
| Starch | 70 |
| Stearic acid | 5 |
| Mg. stearate | 5 |

Ampoules i.m.

|  | Mg. |
|---|---|
| Diethyl α-(2-dibenzofuranyl-malonate | 300 |
| Sodium carboxymethyl cellulose | 20 |
| NaCl | 15 |
| Tween 80 | 1.2 |
| Tween 81 | 10 |
| Benzyl alcohol | 15 |
| Water q.s. to 3 ml. | |

Suppositories

|  | G. |
|---|---|
| Diethyl α-(2-dibenzofuranyl)-malonate | 0.300 |
| Witepsol W 45 | 0.200 |
| Witepsol E 75 | 1.700 |
| Tween 61 | 0.100 |

The following nonlimitative example illustrates the invention.

EXAMPLE 1

Preparation of diethyl α-(2-dibenzofuranyl)-malonate

An amount of 8.6 g. of sodium is dissolved in 240 ml. of anhydrous ethanol, then the solvent is distilled off on an oil-bath. The residue of sodium ethoxide is dissolved in 250 ml. of diethyl carbonate, then a solution of 69 g. of ethyl 2-dibenzofuranylacetate in 250 ml. of diethyl carbonate is added slowly during 2½ hours. The temperature of the bath is raised up to 150° C. until the solvent is completely removed. The mixture is then poured into ice-water, acidified with hydrochloric acid, and extracted with diethyl ether. The ether extracts are dried over sodium sulfate and concentrated to dryness. The residue is recrystallized from isopropyl ether to give 67 g. of diethyl α-(2-dibenzofuranyl)-malonate M.P. 84.5–85° C.

Analysis.—Calculated for $C_{19}H_{18}O_5$ (percent): C, 69.92; H, 5.56. Found (percent): C, 70.11; H, 5.39.

We claim:
1. Diethyl α-(2-dibenzofuranyl)-malonate.

References Cited

UNITED STATES PATENTS 2,498,473   2/1950   Abbot, Jr. _____ 260—346.2

OTHER REFERENCES

Wagner et al.: Synthetic Organic Chemistry, N.Y., John Wiley (1953), p. 488–9.

ALEX MAZEL, Primary Examiner

B. I. DENTZ, Assistant Examiner

U.S. Cl. X.R.

424—285